UNITED STATES PATENT OFFICE.

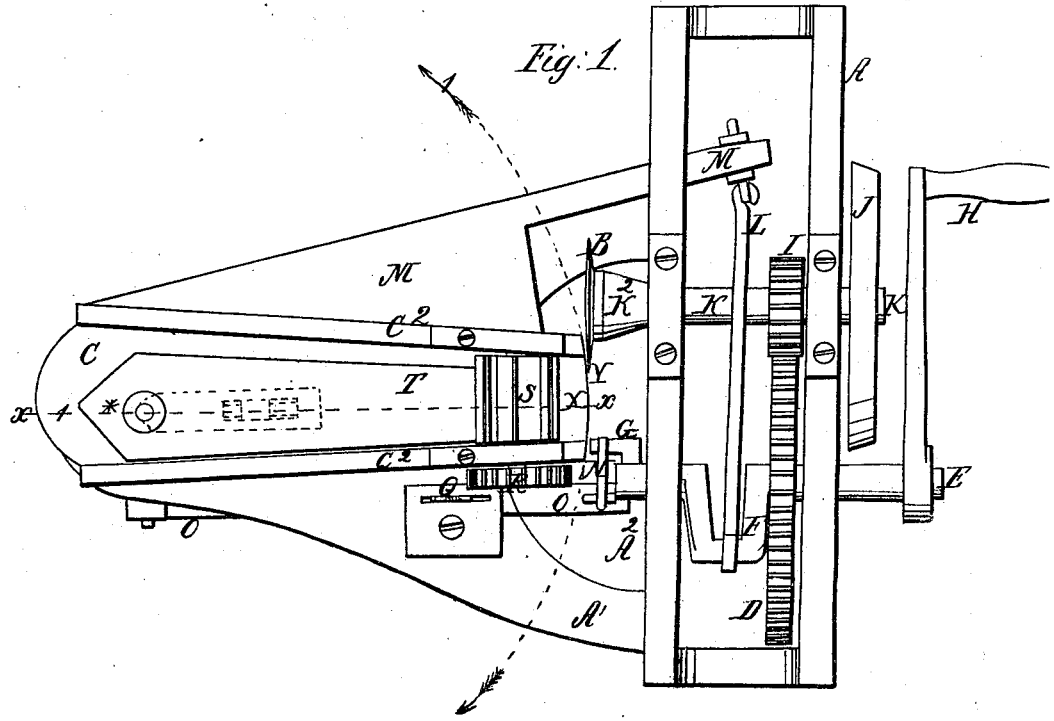

JOHN ROMANS, OF ROMANSVILLE, PENNSYLVANIA.

STRAW-CUTTER.

Specification of Letters Patent No. 5,642, dated June 20, 1848.

*To all whom it may concern:*

Be it known that I, JOHN ROMANS, of Romansville, in the county of Chester and State of Pennsylvania, have invented a new and useful Machine for Cutting Straw and other Substances, which is described as follows, reference being had to the annexed drawings of the same, making part of this specification.

Figure 1, is a top view of the machine, the knife being in a position to cut the substance in the box. Fig. 2, is a side elevation of the machine. Fig. 3, is a vertical longitudinal section of the feed box, on the line X—X of Fig. 1, showing the apparatus by which it is adjusted to the knife, and also its spring bottom. Fig. 4, is a front view of the mouth of the box.

The arrow No. 1, indicates the direction of the movement of the straw holder, during the operation of cutting the straw.

The arrow No. 2, indicates the direction in which the holder moves, when approaching the feed or reaching arm.

The *, indicates the center pin, on which the holder turns.

The same letters in the different figures refer to corresponding parts.

The nature of my invention and improvement, consists in combining in a suitable frame, a fixed revolving circular cutting knife, with a cutting box or holder, of the substances to be cut, which moves with a vibratory, alternate, rectilinear, or other motion, whereby, the substance to be cut is presented to the knife in such a manner that successive lengths, layers, or slices are cut off without changing the position of the axis of the circular knife.

The frame of the machine may be made of wood, or iron, or of wood and iron combined, in the form represented at A Fig. 1, or of any other suitable or approved form. Of the propelling machinery, it may also be said, that the several parts may be constructed and arranged in the manner represented, or otherwise, as may best suit the views of the constructor.

A is a frame, which contains and supports the wheels, cranks, connecting rods, and knife.

A′ is a platform, joined firmly to the frame A, having a spaced A², adjoining the frame A, cut out for the purpose of allowing the straw, or other substance, when cut, to drop down from the knife into a basket or other receptacle placed to receive it. The outer end of the platform is supported by the leg A³. This platform is for the purpose of sustaining the movable cutting box C, which vibrates upon it—turning upon the point *, as a center.

D is the main driving wheel, whose axle E is bent so as to form the crank F. The journals of the axle, turn in boxes formed or placed in the frame A. To the inner end of the axle is secured the crank G, and to its outer end the winch H, by which the wheel D, is driven, which, together with its crank axle, operates the whole machine.

I is a pinion on the axis of the knife B, which gears into the wheel D. The boxes of the axis K of the knife, are formed in the frame A, or secured thereto.

J is a balance wheel.

L is a connecting rod which joins the crank F, and the arm M, of the cutting box, and by which, when the crank revolves, the cutting box is vibrated.

G is a crank, on the axle E, on the side thereof opposite the crank F, connected by a pitman rod N to a vibrating lever O, carrying the reaching arm Q, of the feeding apparatus, to advance to the knife or saw, the substance being cut, at the proper time.

N is the connecting rod, which joins the vibrating lever O, to the crank G, which moves between the guides P, and whose fulcrum is in the leg A³ of the platform A′.

Q is a reaching arm or ratchet dog, passing through a mortise in the platform A′ which acts as a guide to keep it in its proper position. Its lower end is connected with the lever O, by a joint pin, which allows it to turn freely, as much as is required. This arm or dog, when depressed by the turning of the crank G, catches or hooks against the cogs of the wheel R, which is attached to the axis of the feed roller S, and turning, it advances the substance to be cut, through the mouth of the feed box. The action of the dog upon the feeding wheel, being at the extreme of the vibration.

The feed box, is composed of a bottom board C, one of its sides extending out to form the arm M, and having the two side pieces C², erected perpendicularly thereon, to form a trough, to contain the straw, or other substance, to be cut. The end of the box, next the knife, is of a convex form, and is curved with a radius equal to the distance between said end, and the pivot *, on which the box turns. In the front end of the box, is fixed a steel bar X, bent in the form of the letter U, or in the form of an oblong square of three sides—two of the sides being long, and one short—between the long sides of which, the straw passes before the knife. This bar, or metallic facing, or lining, of the feed box, made convex on the side next to the knife, moves as near the edge of the knife, as possible, but so as not to touch it, in order that the support of the substance being cut, may be as near to the cut as possible, which causes it to be held more firmly, and be more easily cut. The curvature of the facing Y, next the knife, should be the segment of a circle, described from the point *.

The straw, or other substance being cut, is advanced to the knife, by the action of the feed roller S, turned by the ratchet dog Q, as aforesaid, beyond the end of the trough C, a distance equal to the length, into which it is desired to cut, the same at each vibration or movement of the box, and at that part of the vibration, when the knife is not in front of the box, to obstruct the advance of the straw, as aforesaid. The feed roller is made of wood, of cylindrical form, with radial ribs of sheet iron, parallel to its axis, projecting from its periphery. The straw may be held up against the roller by a false bottom T, with springs s, under it, or by a spring board, which would increase the friction between it, and the roller, and cause it to be moved along to the knife, with greater certainty, and regularity, and do away with springs, over the axle of the feed roller. The holder of the straw, or substance being cut, may be caused to move on ways or guides, which are straight, and parallel, to the plain of motion of the knife, alternately from one side to the other of it—or may be caused to move by any other means, it may be thought proper to adopt, whereby transverse sections of the substance to be cut, may be presented in successive parallel layers, lengths or slices to the knife.

The knife B is a disk of steel, or of iron faced with steel, and for a common sized machine, about five inches in diameter. It is thickest in the center, and diminishes in thickness to the circumference, where it is reduced to a smooth, even, and sharp edge. It is secured to the head $K^2$, of the axle K, by a screw, passing through its center, or by any other secure means. It may be circular or other shape, and its edges may be serrated or otherwise formed.

The before described cutting apparatus, is well adapted to the use of bookbinders, for the purpose of cutting paper, or the edges of books, and for harness makers, and shoemakers.

It is also adapted to the cutting of dried or fresh meat, and bread, and can with advantage be used in almost every branch of the useful arts, in which fibrous, or textile, substances, have to be cut, to any great extent.

In order to set the mouth of the box in a proper position, so as to bring it sufficiently near to the knife, without touching it, and at the same time sustain the substance, in a proper position to be cut, in the most effectual manner, the whole box is advanced or receded, on the platform, and then made fast by means of a nut W, screwed on the end of a screw bolt V, passing through the plate, and platform, having a head, whose sides slope downward, and inward, toward the shank, placed in an oblong opening in a plate, fastened in any required position to the platform, by the aforesaid screw bolt and nut—said plate being turned up at its rear end at right angles, forming a pivot on which the box turns. The plate is let into a depression, or cavity, made in the platform, so that its upper surface shall be even with the top of the platform, and the bottom of the box. The sides of the opening in the plate, are made beveling, or flaring upward, and outward, to correspond with the beveled sides, of the head of the confining bolt aforesaid. The bolt is immovable. The plate and box move together; and the box turns on the plate.

The operation of the machine is as follows: The operator takes hold of the handle of the winch H, and turns it, which revolves the cranks F, and G, and the wheel D. The wheel D gears into the pinion I, which revolves the knife, and the balance wheel J, which are both on the same shaft.

The crank F, in the meantime, through the connecting rod L, vibrates the cutting box C, by the arm M, alternately before, and to one side of the knife. At the same time the crank G, through the agency of the connecting rod N, depresses the lever O, and the ratchet dog Q, which hooks upon, and turns the wheel R, and with it the feed roller, which advances the straw, or whatever substance is being cut, every time the feed box or holder is, during its vibration, moved to one side of the knife—thus for every slice of cut, there is one direct, and retrograde, or reciprocal motion of the box, and several revolutions of the knife.

A circular roughened disk, for grinding the substances after being cut, may be placed on the crank shaft, opposite to a corresponding stationary, roughened plate, or disk, fastened to the frame, between which disks, the substances, as cut, are conveyed by a suitable conductor, and ground to the degree of fineness required.

When the mouth of the feed box, requires to be adjusted to the edge of the knife, the nut W, must be unscrewed, and the box C, $C^2$, advanced toward, or receded from the knife B, as may be required, and then screwed up firmly against the underside of the platform A'.

A series of cutter may be attached to the axle of the fly wheel.

What I claim as my invention and desire to secure by Letters Patent is—

1. The mode herein described of cutting straw, hay, fodder, and other substances by means of the movable holder C in which the substance to be cut is confined being made to move in the arc of a circle, toward and from the rotary cutter B in combination with the revolving cutter or knife B whose axis remains unchanged—the several parts being arranged and operated in the manner described above, or other mode substantially the same by which analogous results are produced.

2. I also claim the mode of feeding by moving the holder in the arc of a circle around to the reaching arm Q and bringing the cog wheel R of the feed roller in contact with the reaching arm, after the mouth of the box has moved from the knife, as described.

3. I likewise claim the arrangement of the false bottom T in combination with the vibrating holder C.

In testimony whereof I have hereunto set my hand and seal in the presence of two subscribing witnesses this 14th day of September A. D. 1847.

JOHN ROMANS.

Witnesses:
Wm. P. Elliot,
A. E. H. Johnson.